United States Patent
Boudreau et al.

(10) Patent No.: US 12,188,747 B2
(45) Date of Patent: ***Jan. 7, 2025

(54) FIREARM GAS DISCHARGE DEFLECTOR

(71) Applicant: Sig Sauer, Inc., Newington, NH (US)

(72) Inventors: Christopher J. Boudreau, Estacada, OR (US); Andrew W. York, Portland, OR (US); John P. Nichols, Tigard, OR (US); Drew A Essig, Portland, OR (US)

(73) Assignee: SIG SAUER, INC., Newington, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,447

(22) Filed: Feb. 23, 2023

(65) Prior Publication Data

US 2023/0204324 A1    Jun. 29, 2023

Related U.S. Application Data

(63) Continuation-in-part of application No. 17/410,955, filed on Aug. 24, 2021, now Pat. No. 11,614,291.

(60) Provisional application No. 63/313,172, filed on Feb. 23, 2022, provisional application No. 63/069,505, filed on Aug. 24, 2020.

(51) Int. Cl.
| | |
|---|---|
| *F41G 1/06* | (2006.01) |
| *B29C 45/14* | (2006.01) |
| *F41A 9/53* | (2006.01) |
| *B29L 11/00* | (2006.01) |

(52) U.S. Cl.
CPC .............. *F41G 1/065* (2013.01); *B29C 45/14* (2013.01); *F41A 9/53* (2013.01); *B29L 2011/00* (2013.01)

(58) Field of Classification Search
CPC .................................. F41A 9/53; F41A 13/06
USPC ...................................... 42/1.05, 85, 90, 106
See application file for complete search history.

(56) References Cited

U.S. PATENT DOCUMENTS

| | | | | |
|---|---|---|---|---|
| 790,634 | A * | 5/1905 | Hirsh | F41C 3/16 |
| | | | | 42/1.05 |
| 968,139 | A | 8/1910 | Febiger | |
| 1,028,032 | A * | 5/1912 | Krag | F41A 9/53 |
| | | | | 89/142 |
| 1,459,284 | A * | 6/1923 | Declaye | F41A 9/53 |
| | | | | 42/1.05 |
| 1,992,934 | A | 3/1935 | Bamberger | |
| 11,614,291 | B2 * | 3/2023 | Essig | F41A 9/53 |
| | | | | 42/90 |

(Continued)

FOREIGN PATENT DOCUMENTS

WO    WO-2018102858 A1 *    6/2018    .............. F42D 1/18

*Primary Examiner* — Bret Hayes
(74) *Attorney, Agent, or Firm* — Miller Nash LLP (57) ABSTRACT

An accessory for a firearm includes a deflector integrated into the accessory and structured to alter a path of discharge gasses and/or debris after such gasses and debris are emitted from the firearm when the firearm is discharged. The deflector may be sized and shaped to alter a path of discharge gasses and/or debris after such gasses and debris pass a Loaded Chamber Indicator (LCI) of the firearm. The LCI indicates a presence of a cartridge within a firing chamber of the firearm, but openings within and around the LCI also provide a path for hot gasses and debris to strike accessories, which causes fouling and other deterioration.

17 Claims, 9 Drawing Sheets

(56) References Cited

U.S. PATENT DOCUMENTS

2013/0180152 A1* 7/2013 Speroni .................... F41G 1/35
                                                            42/99
2021/0325146 A1   10/2021 Thomele et al.

* cited by examiner

FIREARM GAS DISCHARGE DEFLECTOR

CROSS REFERENCE TO RELATED APPLICATIONS

This application is a continuation in part of co-pending U.S. patent application Ser. No. 17/410,955, filed Aug. 24, 2021, entitled FIREARM GAS DISCHARGE DEFLECTOR, which is a non-provisional of and claims benefit to U.S. Provisional Patent Application No. 63/069,505, filed Aug. 24, 2020, entitled FIREARM GAS DISCHARGE DEFLECTOR. This application is also non-provisional of and claims benefit to U.S. Provisional Patent Application No. 63/313,172, filed Feb. 23, 2022, entitled FIREARM GAS DISCHARGE DEFLECTOR. The above-referenced patent applications, i.e., U.S. patent application Ser. No. 17/410,955 as well as U.S. Provisional Patent Applications 63/069,505 and 63/313,172 are expressly incorporated by reference herein.

TECHNICAL FIELD

This disclosure relates to firearm accessories, and, more particularly, to a deflector for preventing discharge gasses and debris from contaminating portions of the firearm or firearm accessories.

BACKGROUND

Many firearms, especially pistols, include a Loaded Chamber Indicator (LCI) to indicate that a bullet, or round, is in the firing chamber. Most firing chambers completely surround a loaded round, and, without an LCI, it is very difficult or impossible for a shooter to know whether the chamber is loaded, since the round is completely covered and cannot be seen. Without an LCI, there is no external distinction between an empty chamber and one that is loaded.

Firearms with an LCI instead provide an indication, such as a colored tab, that raises to enter the shooters field of view to indicate that the chamber is loaded. Typically an LCI includes a small metal bar with a red tip. When no round is chambered, the LCI is not activated and no red tip is visible. Conversely, when a round is chambered, the metal bar is physically moved upward so that the red tip extends away from the chamber and into the shooter's view. In this way the shooter can readily determine whether the chamber is loaded by inspecting for the presence of the red tip. If the red tip of the LCI is visible, or otherwise indicated by the LCI, the chamber is loaded; if no such tip is visible, the chamber is empty. Not all LCIs are physically formed in the same way but they all function in the same way—that is, they all provide a visual indication of a loaded chamber.

Due to the physical structure of the LCI, the top of the chamber is generally not sealed. This means that, when the firearm is fired, hot gasses and debris from the exploding gunpowder rushes out of the chamber in any available direction. Since the LCI is generally mounted at the top of the chamber, to provide the best visibility, this means that significant gas and debris rushes out from the top of the gun. These gasses and debris can not only foul equipment, but also can be ejected onto surfaces, such as glass and plastic sights. Over time the debris can accumulate to cause the sight surface to become cloudy, and the ejected gasses may even damage the surface over time.

Many government entities are requiring all new weapons to include an LCI, and thus the problem is getting more significant.

Embodiments of the disclosure describe a new type of accessory control.

DETAILED DESCRIPTION

Embodiments of the invention employ a gas discharge deflector to divert hot ejection gasses and debris from hitting a desired portion of the firearm, such as a sighting lens. Such hot ejection gasses and debris are generated when the firearm is discharged as a result of the rapidly burning gunpowder from a cartridge fired by the firearm. Embodiments are also directed to an accessory for a firearm that includes a deflector structured to alter a path of discharge gasses and/or debris after such gasses and debris pass a Loaded Chamber Indicator (LCI) of the firearm. The LCI indicates a presence of a cartridge within a firing chamber of the firearm, but openings within and around the LCI also provide a path for hot gasses and debris to strike accessories, which causes fouling and other deterioration, as described in detail below.

Figure 1:
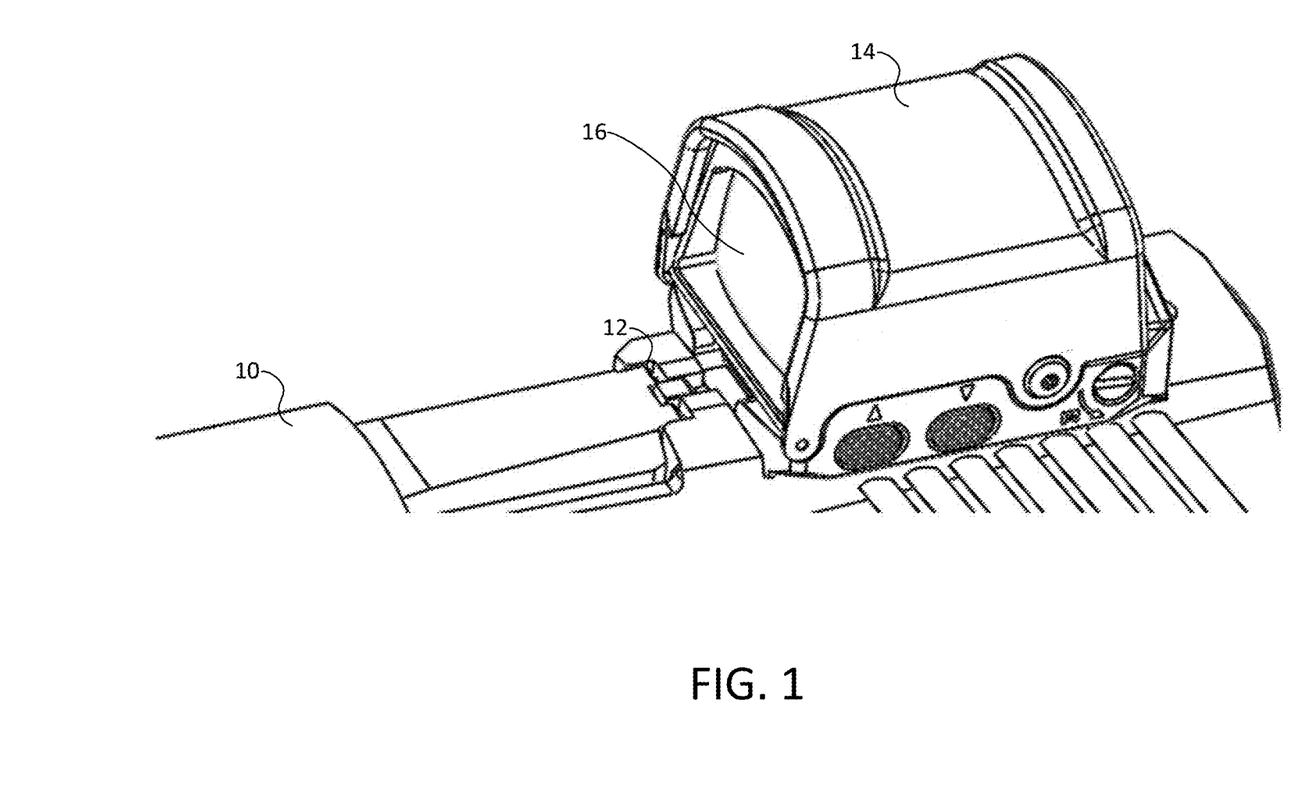
FIG. 1 is a side perspective view of a conventional pistol having a Loaded Chamber Indicator (LCI) including a sighting accessory.

FIG. 1 illustrates the typical position of a Loaded Chamber Indicator (LCI) 12 at the top of a firearm, in this case a pistol 10, as well as a sighting accessory 14. In FIG. 1, the sighting accessory 14 is a target sight commonly called a red dot sight. Such sights generally include a transparent surface, which is also called a sight glass 16, near the LCI 12, as is illustrated in FIG. 1. Embodiments of the invention are applicable to any type of accessory where it is desired to shield the accessory or portions of the firearm itself from ejection gasses and/or debris expelled from a firing chamber of the firearm when the firearm is discharged.

Figure 2:
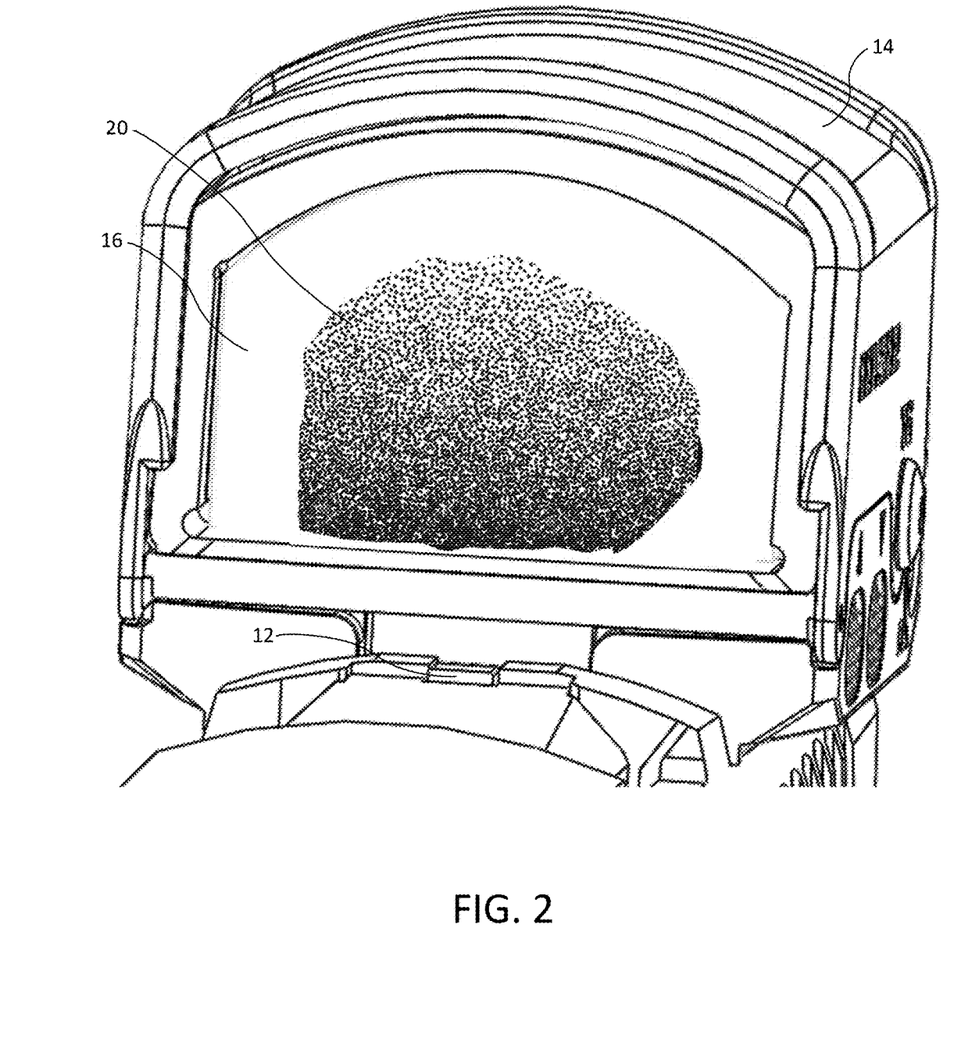
FIG. 2 is a front perspective view illustrating how ejection gasses and debris accumulate on the sighting accessory illustrated in FIG. 1.

FIG. 2 illustrates an example portion of the sight glass 16 affected by the ejecting gas and debris from the cartridge when the weapon is fired. When the gun is fired, the hot gasses and debris from the burning gunpowder of the cartridge rush out of the firing chamber, past the openings made by the LCI 12, toward the top of the pistol 10 and accessory 14. Significant gas and debris may be ejected toward the transparent sight glass 16 of the target sight 14. The exhaust from the explosion projects onto the lens 16 of the sight 14. The particles 20 from the exhaust also collect onto the lens 16 over time. The collection of particles 20 quickly accumulates, and, if enough debris accumulates on the target sight, renders the sight difficult to use or even useless by blocking the view of the user. The gasses themselves may also negatively affect the material of the lens of the sight glass 16, or coatings used in or on the sight glass. The particles 20 illustrated in FIG. 2 are only one example of how such particles may be distributed on a sight glass 16. In reality, the particles 20 may have different patterns, shapes, densities, etc.

Figure 3:
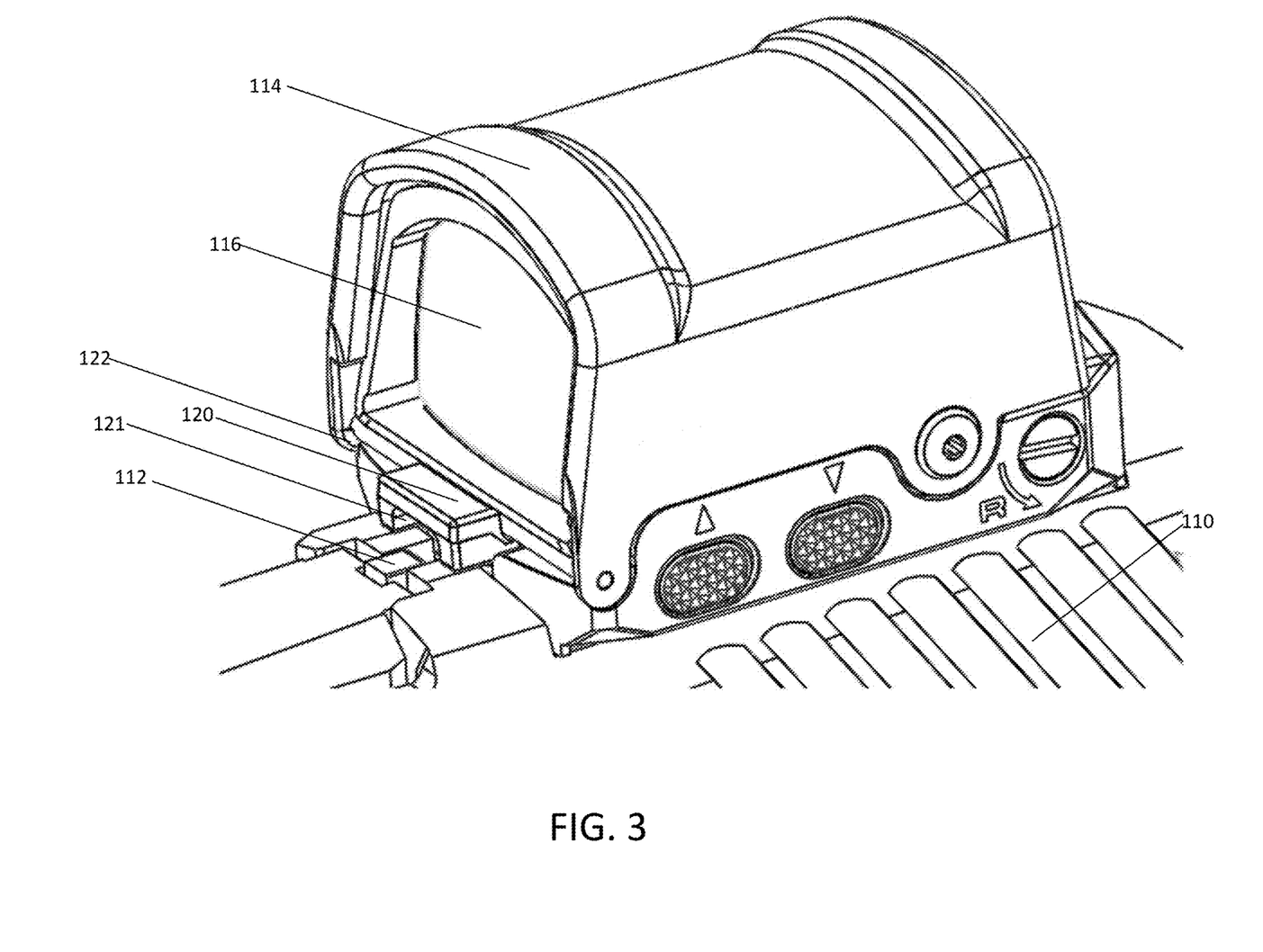
FIG. 3 is a side perspective view of a pistol having an LCI and including a gas discharge deflector, according to embodiments of the invention.

FIG. 3 is a side perspective view of a pistol 110 having an LCI 112 and a targeting sight accessory 114 with a transparent lens or surface 116. Further illustrated in FIG. 2 is a gas discharge deflector 120, which functions to route hot gasses away from the targeting sight 114 when the weapon is being fired.

The deflector 120 may be formed of any suitable material, such as plastic or metal. In one embodiment the deflector 120 is composed of glass-filled nylon, but may be formed of any material that is durable and may be formed or placed to block cartridge gasses and/or debris. When installed onto a pistol 110, the deflector 120 may be located between the LCI 112 and any accessory that is desired to be shielded from the discharge gasses. Or, the deflector 120 may block the discharge gasses and particles from a portion of the firearm 110 itself. In the installation illustrated in FIG. 3, the deflector 120 is inserted into a recess or pocket of the targeting sight 114, and is retained by a crossbar 122, as described in detail with reference to FIGS. 5A and 5B. Other retention mechanism may operate to maintain the deflector 120 in position. The position of the deflector 120 is such that it blocks some, most, or all of the exhausted gasses and debris that vent around the LCI 112, so the gasses are blocked from reaching or affecting the sight glass 116 or other portion of the accessory 114 or firearm 110. This reduces or eliminates the accumulation of debris from depositing onto the sight glass 116 or elsewhere. The deflector 120 also prevents or substantially reduces gasses from reaching the surface of the sight glass 116, to prevent damage from the gas. Note, too, that the deflector 120 may be shaped and placed in such a way to not interfere with the operation or the function of the LCI 112, thus allowing the LCI 112 to continue to function as a safety feature of the pistol 110.

In the illustrated embodiment of FIG. 3, the deflector 120 includes a scallop or indented shape 121 to help route the exhausted gasses away from the surface of the sight glass 116. Other embodiments may have different shapes, of either the deflector 120 itself or any indentations 121, but act to provide the same or similar function of preventing at least some of the gasses and debris from the exploding cartridge from reaching or accumulating on the surface of the sight glass 116, or other portion of the firearm 110 or firearm accessory 114 desired to be shielded.

Figure 4:
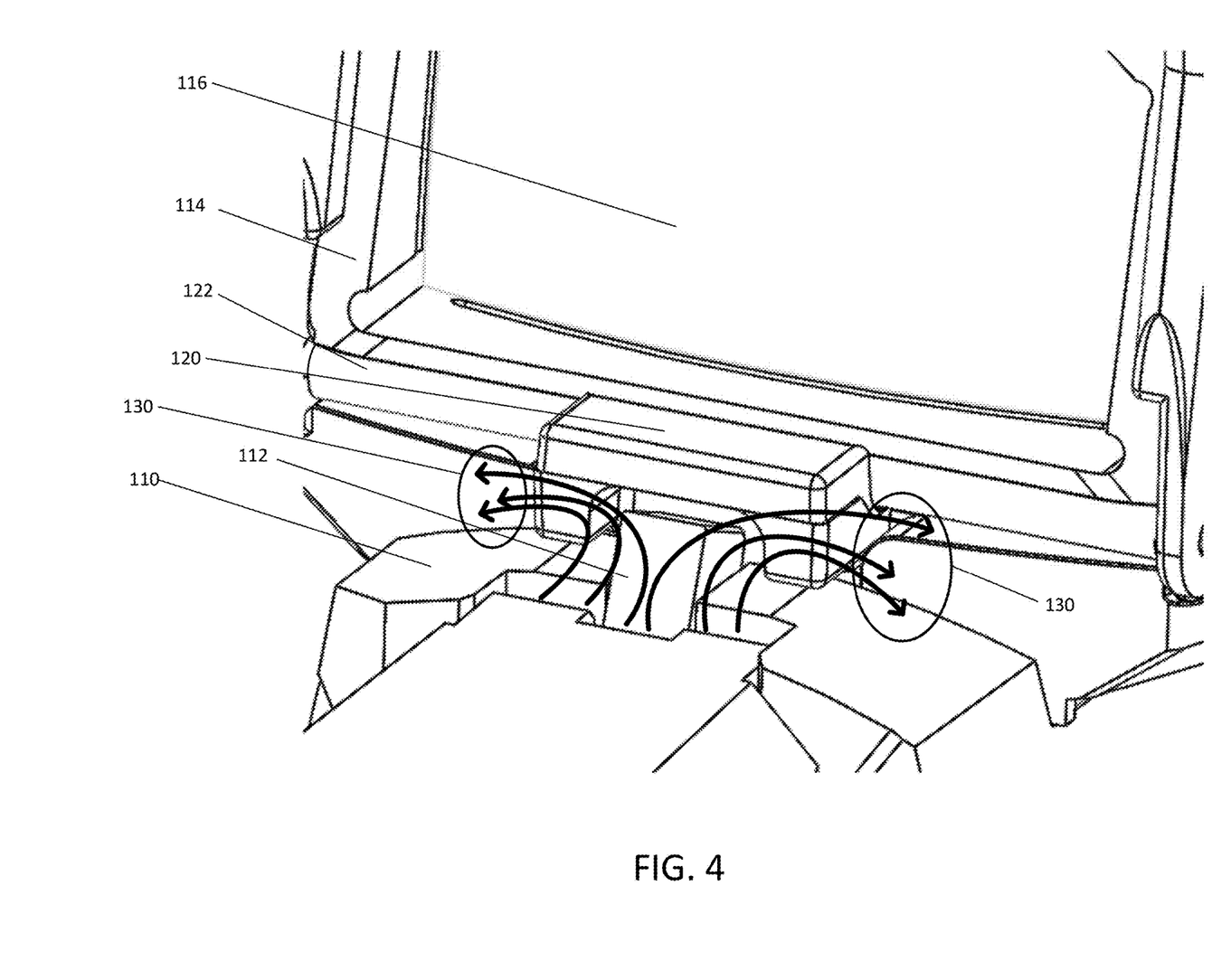
FIG. 4 is a magnified perspective view of the pistol of FIG. 3 illustrating a modified gas discharge path due to the presence of the gas discharge deflector, according to embodiments of the invention.

FIG. 4 is a magnified perspective view of the pistol of FIG. 3 illustrating a modified gas discharge path 130 due to the presence of the gas discharge deflector 120, according to embodiments of the invention. In this embodiment the LCI 112 is in the active position, which indicates that a cartridge is loaded into the firing chamber of the pistol 110. The indication may be seen by a shooter through or around the accessory 114, or the shooter may use his or her finger to determine whether the LCI 112 is in the active position, which indicates that a cartridge is present, or the inactive position, which indicates that the firing chamber is empty.

An example path 130 of the discharging gas and debris due to discharging the firearm is illustrated in FIG. 4. Initially these discharged gasses are directed upward from the chamber, around and through the LCI 112 toward the top of the firearm 110. In firearms that have the gas discharge deflector 120 installed, the gasses and debris strike the deflector 120 before reaching the forward lens 116 of the accessory 114. The discharge deflector 120 creates a physical barrier preventing the gas and debris from reaching the lens 116, and instead causes the discharge gasses and debris to be routed away from the firearm 110, lens 116, or other accessory or portion of an accessory desired to be so protected from the gas discharge. FIG. 4 illustrates how the discharge deflector 120 blocks or interrupts the discharge path 130 of the blocked gasses so that they are diverted away from the firearm 110 and accessory 114. In practice, the discharge gasses may not flow exactly as depicted in FIG. 4, but in any case are generally directed away from the lens 116 and the accessory 114.

In some embodiments, the gas discharge deflector 120 is removable from the accessory 114, while in other cases the gas discharge deflector 120 may be integrated into the accessory itself. For example, in embodiments where the accessory is an optical sight, the gas discharge deflector 120 may be machined directly into the housing of the optical sight when the optical sight is manufactured as described with reference to FIGS. 6-9 below. In such embodiments, the gas discharge deflector 120 and the accessory may be secured and/or removed from the firearm as a single unit. In yet other embodiments, the gas discharge deflector 120 may be integrated into the firearm, such as a part of the LCI 112 itself.

Figure 5A:
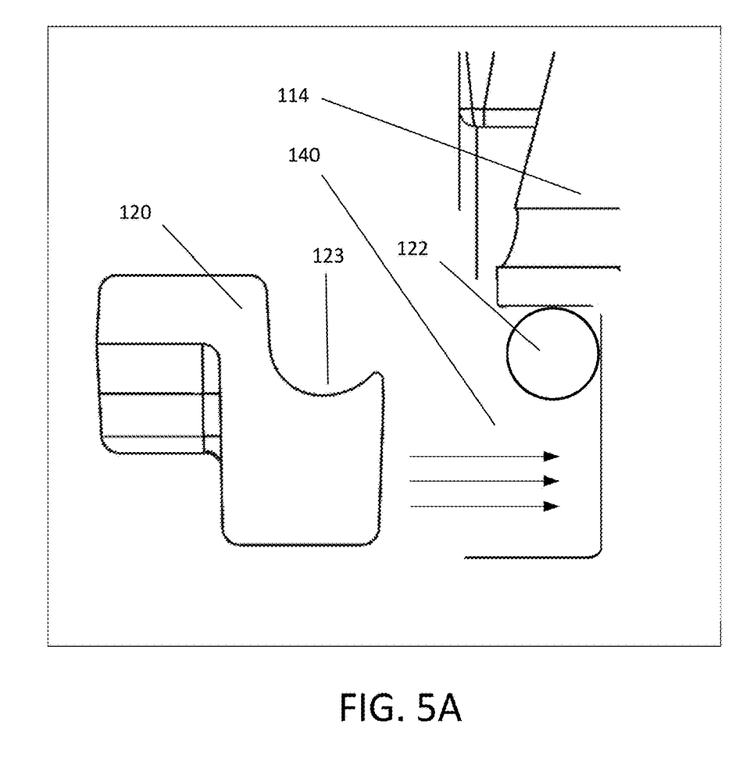
FIGS. 5A and 5B are cross-sectional views that illustrate how the gas discharge deflector of FIG. 3 may be inserted into and retained by elements of the sighting accessory.
Figure 5B:
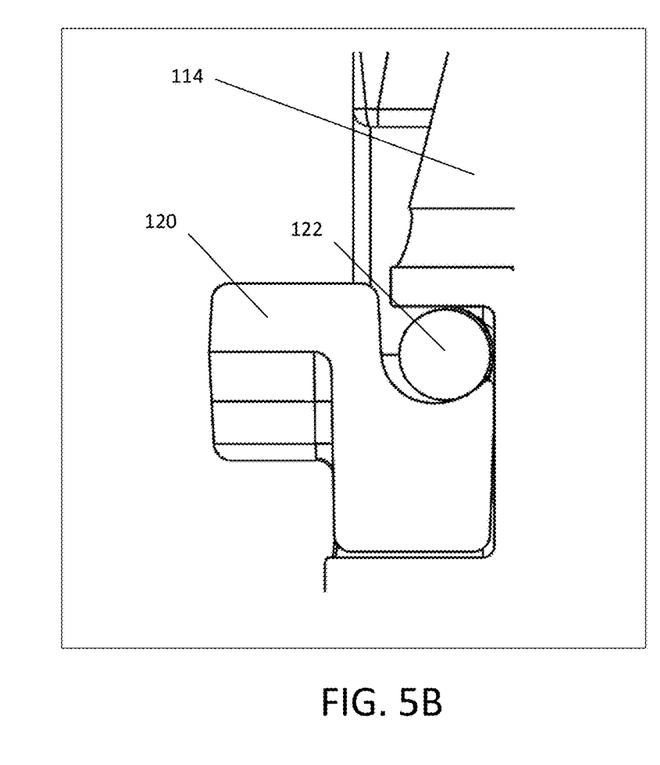

FIGS. 5A and 5B are cross-sectional views that illustrate how the gas discharge deflector 120 may be inserted into and retained by elements of the sighting accessory 114. With reference to FIG. 5A, the gas deflector 120 is shaped with a groove 123 or indentation. The groove 123 of the gas deflector 120 is shaped to be mechanically retained by the crossbar 122 of the sighting accessory 114. The sighting accessory 114 also includes a pocket or recess 140 shaped to generally accommodate the shape of the gas deflector 120. In general, to insert the gas deflector 120 into the sighting accessory 114, a user inserts the gas deflector in the direction of the indicated arrows toward the recess 140 of the sighting accessory, where a lip of the groove 123 contacts the crossbar 122. In one embodiment, further pressure of the gas deflector 120 toward the recess 140 causes the lip of the groove 123 to deform or deflect under the rigid crossbar 122, until finally snapping into place, as illustrated in FIG. 5B. In other embodiments the recess 140 is sized to be slightly larger than the gas deflector 120, and the gas deflector is forced downward while being pressed into the recess 140. In other embodiments a combination of both of these movements occur, where the lip of the groove 123 may yield somewhat while the gas deflector 120 itself may deflect somewhat, until the groove 123 is positioned against the crossbar 122 as illustrated in FIG. 5B. The gas deflector 120 may be removed by reversing the process, by pulling the gas deflector in the direction opposite the arrows illustrated in FIG. 5A.

In other embodiments, the gas deflector 120 may be wholly integrated into the accessory 114. In such an embodiment the accessory 114 may include a gas deflector portion that is formed coextensive with the accessory. In such an embodiment the crossbar 122 may be inserted into a receiving hole of the accessory 114 to retain the accessory itself in place.

In yet other embodiments the gas deflector 120 may be formed as a separate piece from the accessory 114, but the gas deflector 120 is permanently fixed into the accessory during or after manufacture. In such an embodiment the gas deflector 120 may be held in place in the position illustrated in FIG. 5B by, for example, glue or cement, as well as mechanical fasteners such as screws or pins. In this way the gas deflector 120 may be manufactured as a part separately from the accessory 114, but permanently retained within the accessory.

Figure 6:
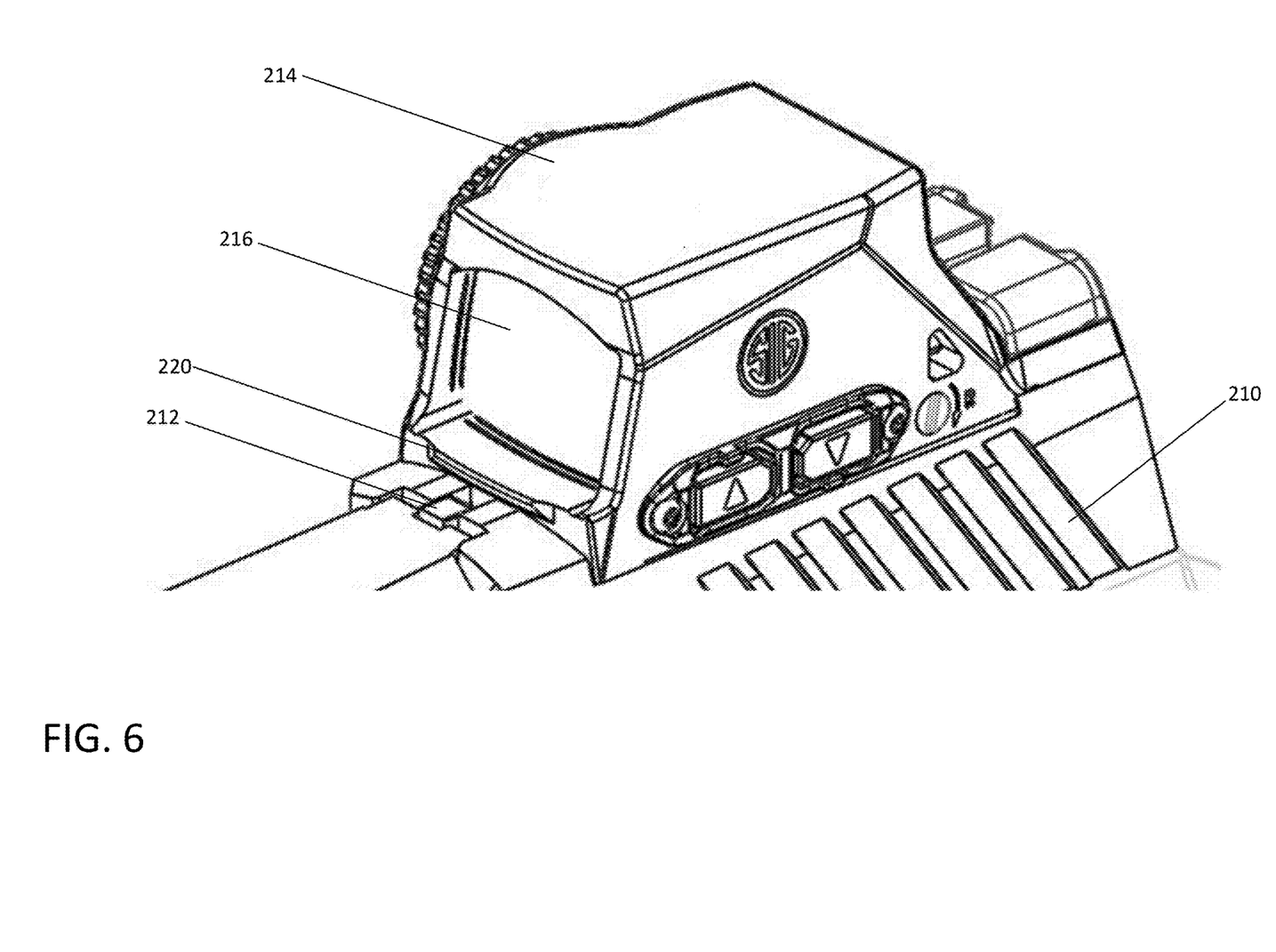
FIG. 6 is a side perspective view of a pistol having an LCI and including a gas discharge deflector integrated into a sight, according to embodiments of the invention.

FIG. 6 is a side perspective view of a pistol 210 having an LCI 212 and a targeting sight accessory 214 with a transparent lens or surface 216. Further illustrated in FIG. 6 is an integrated gas discharge deflector 220, referred to as the deflector or integrated deflector, which, differently than being removable from the sight, is integrated into the targeting sight accessory 214 itself. The gas discharge deflector 220 functions to route hot gasses away from the targeting sight 214 when the weapon is being fired in the same or similar manner as the gas discharge deflector 120 described with reference to FIGS. 1-5. One difference from the gas discharge deflector 120 is that the gas discharge deflector 220 is integrated directly into the targeting sight accessory 214.

The deflector 220 may be formed of any suitable material, such as plastic, metal or carbon fiber. Typical metals for the deflector 220 include aluminum, steel, or Titanium. The deflector 220 need not necessarily be formed from the same material as the targeting sight accessory 214, although it may be preferred to form them from the same material. For instance, the deflector 220 may be formed by machining material as part of the machining process to produce the targeting sight accessor 214. In such a case, the deflector 220 is part of the integrated design of the targeting sight accessory 214. In embodiments where the targeting sight accessory 214 is manufactured by being molded, the deflector 220 is integrated into the mold, or one of the molds, of the sight accessory 214. In other embodiments the deflector 220 may be physically inserted into a void of a mold prior to material filling the mold to create the sight accessory 214 or portion thereof, including the integrated deflector 220.

When installed onto a pistol 210, the targeting sight 214 including the integrated deflector 220 may be located between the LCI 212 and any accessory that is desired to be shielded from the discharge gasses. The deflector 220 blocks the discharge gasses and particles from a portion of the firearm 210 itself.

The position of the deflector 220 is such that it blocks some, most, or all of the exhausted gasses and debris that vent around the LCI 212, so the gasses are blocked from reaching or affecting the sight glass 216 or other portion of the accessory 214 or firearm 210. This reduces or eliminates the accumulation of debris from depositing onto the sight glass 216 or elsewhere. The deflector 220 also prevents or substantially reduces gasses from reaching the surface of the sight glass 216, to prevent damage from the gas. Note, too, that the deflector 220 may be shaped and placed in such a way to not interfere with the operation or the function of the LCI 212, thus allowing the LCI 212 to continue to function as a safety feature of the pistol 210.

In the illustrated embodiment of FIG. 6, the integrated deflector 220 includes an extension or lipped shape to help route the exhausted gasses away from the surface of the sight glass 216. Other embodiments may have different shapes and sizes, but act to provide the same or similar function of preventing at least some of the gasses and debris from the exploding cartridge from reaching or accumulating on the surface of the sight glass 216, or other portion of the firearm 210 or firearm accessory 214 desired to be shielded. In some embodiments the integrated deflector 220 may have a larger lip, or extend further away from the firearm accessory 214 than depicted in these illustrations. In other embodiments, such as described above with the deflector 120, the integrated deflector 220 may include a scalloped or curved shape. Also, the integrated deflector 220 may be more wide or narrow than illustrated.

Figure 7A:
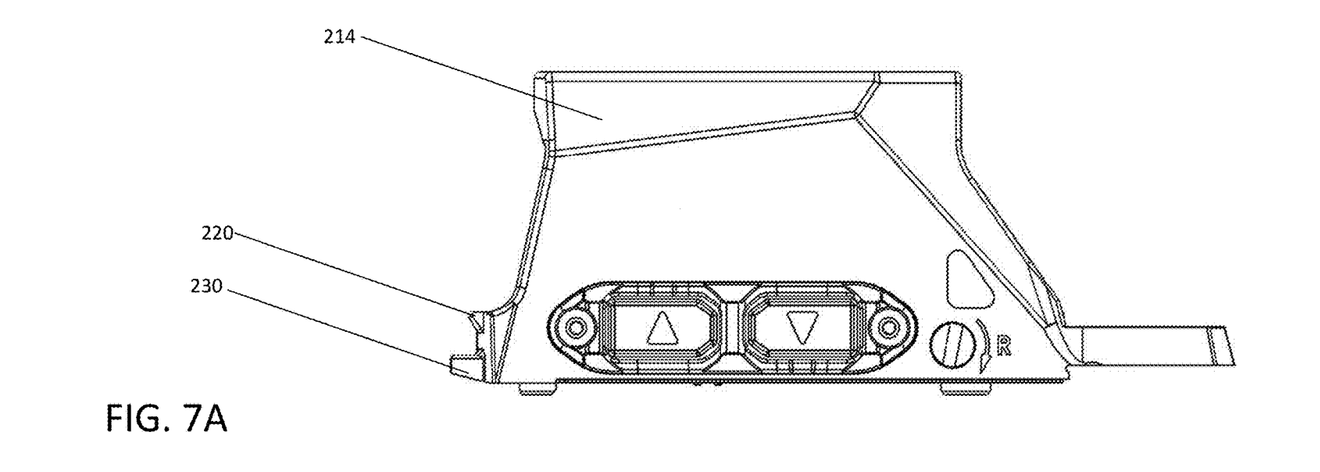
FIG. 7A is a left side view of the firearm accessory of FIG. 6 illustrating an integrated deflector according to embodiments of the invention.

FIG. 7A is a left view of the firearm accessory 214 of FIG. 6 including the integrated deflector 220. The integrated deflector 220 illustrated in these figures is an example embodiment, and may vary in size and shape, for instance. Also illustrated in FIG. 7A is a tab 230 for mounting the firearm accessory 214 to the firearm 210 (FIG. 6).

Figure 7B:
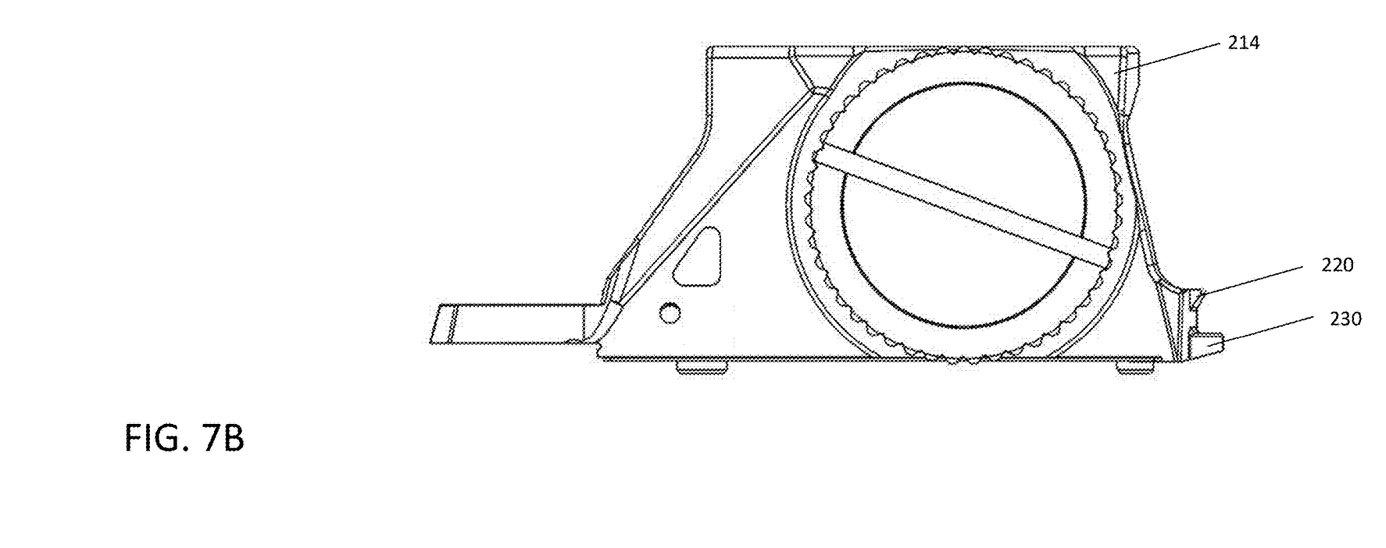
FIG. 7B is a right side view of the firearm accessory of FIG. 6 illustrating an integrated deflector according to embodiments of the invention.

FIG. 7B is a right hand view of the firearm accessory 214 illustrating the integrated deflector 220 and mounting tab 230.

Figure 8:
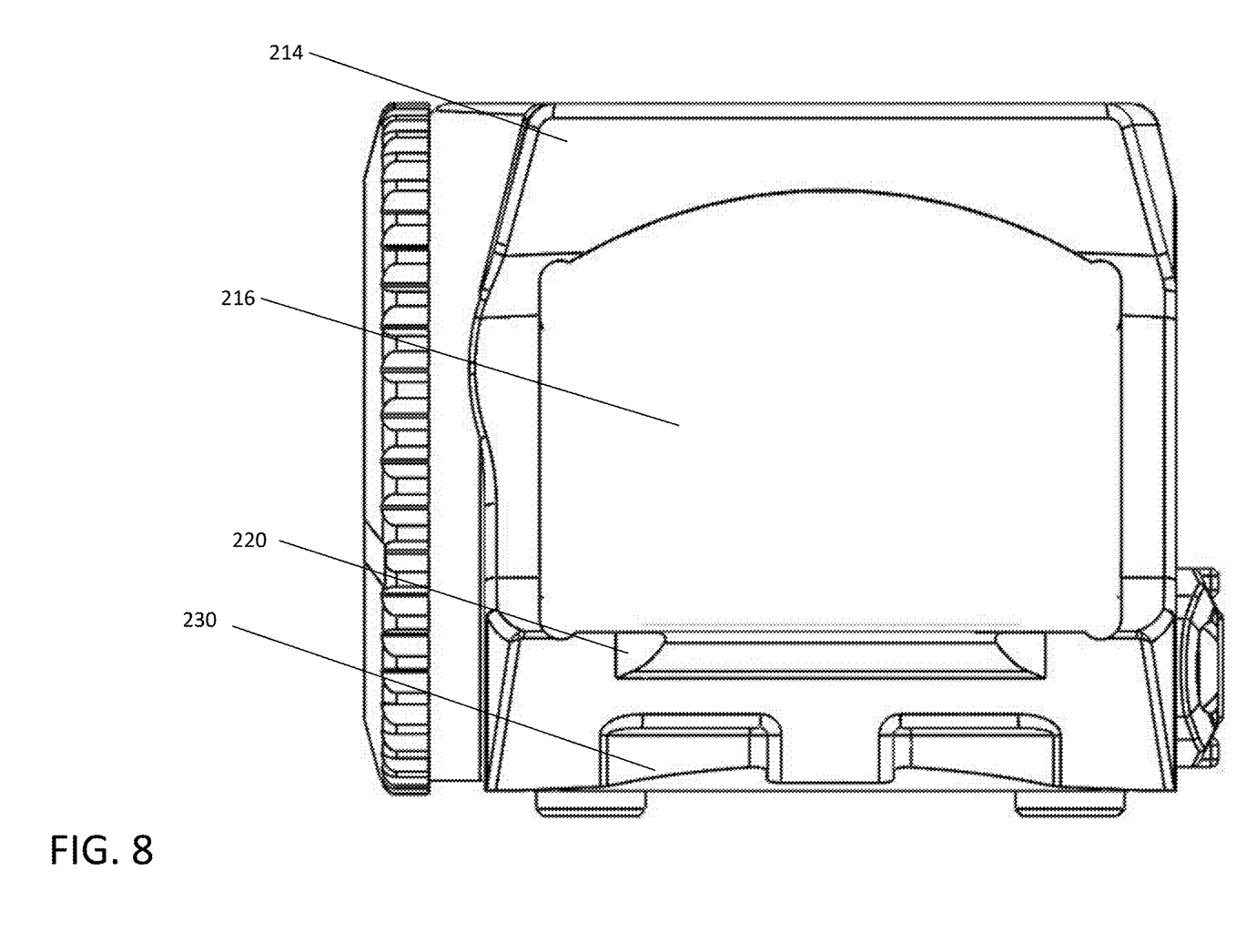
FIG. 8 is a front view of the firearm accessory of FIG. 6 illustrating the integrated deflector.
Figure 9:
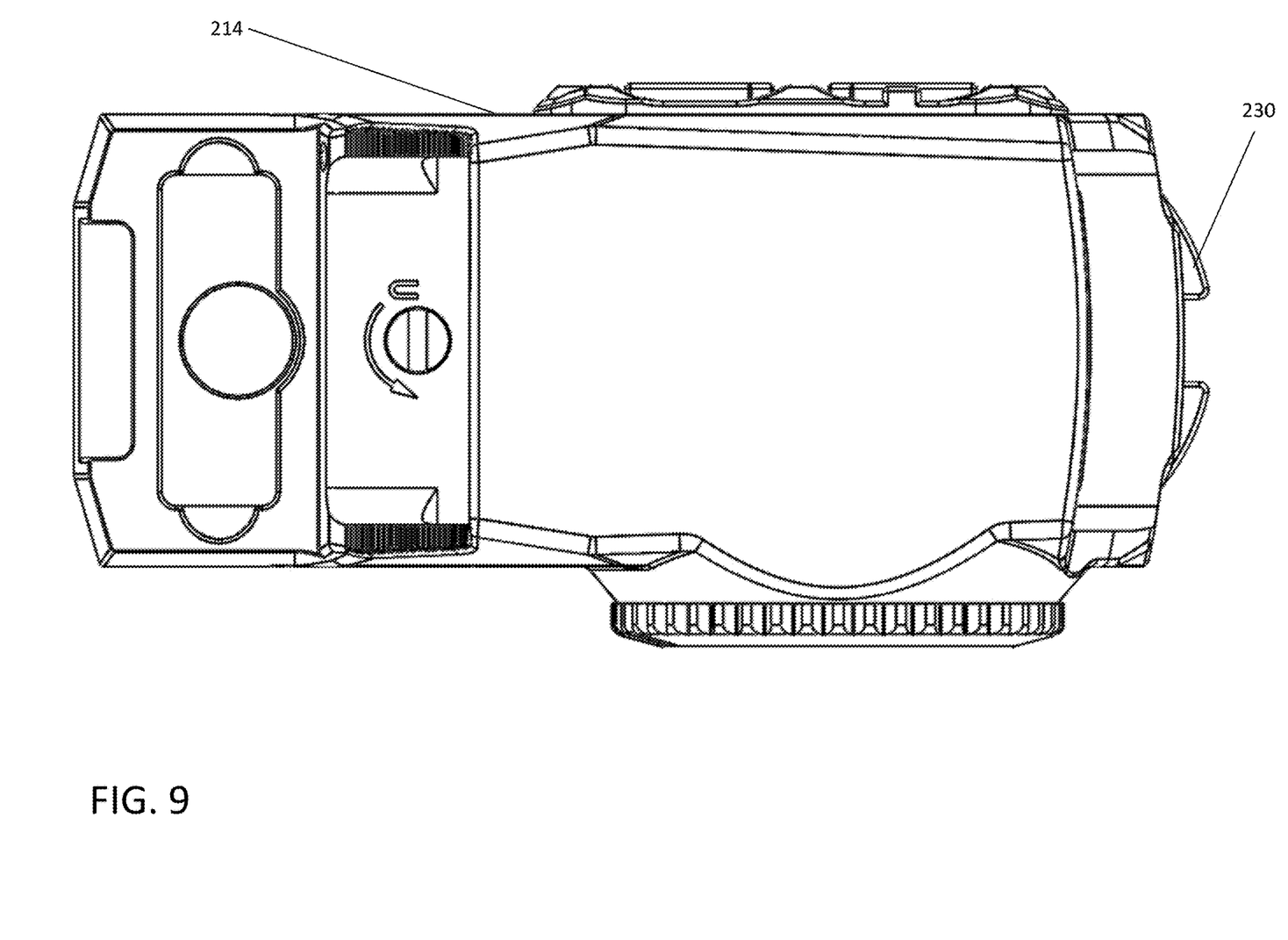
FIG. 9 is a bottom view of the firearm accessory of FIG. 6 illustrating the integrated deflector.

FIG. 8 is a front view of the firearm accessory 214 illustrating the integrated deflector 220, as well as the sight glass 216 and mounting tab 230. For completeness, FIG. 9 is a bottom view of the firearm accessory 214 that illustrates the mounting tab 230, but, for the illustrated embodiment, the integrated deflector 220 is occluded in this view. In embodiments where the integrated deflector 220 is larger or extends beyond the mounting tab 230, the integrated deflector 220 would be visible in this view. As described above, the purpose of the integrated deflector 220 is to block or divert hot gasses and debris escaping past the LCI 212 (FIG. 6) from depositing material or otherwise clouding the sight glass 216 when the firearm 210 is fired, especially when the firearm 210 is fired many times, thus increasing the amount of contaminants discharging past the LCI 212. Although described with reference to an LCI, the integrated deflector 220 prevents contaminants reaching the sight glass 216 or other portions of the firearm accessory no matter what path the contaminants take toward the accessory.

The previously described embodiments of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method or process having two or more defined steps or operations, the defined steps or operations can be carried out in any order or simultaneously, unless the context excludes those possibilities.

Furthermore, the term "comprises," "includes," and their grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components. Similarly, an article "including" or "which includes" components A, B, and C can contain only components A, B, and C, or it can contain components A, B, and C along with one or more other components.

Also, directional words such as "right," "left," "up," "down," "forward," or "backward" are used for convenience and in reference to the views provided in figures.

Although specific aspects of the disclosure have been illustrated and described for purposes of illustration, it will be understood that various modifications may be made without departing from the spirit and scope of the disclosure. Accordingly, the invention should not be limited by the particular embodiments presented herein.

We claim:

1. A firearm, comprising:
a Loaded Chamber Indicator (LCI) that indicates when a cartridge is loaded into a firing chamber of the firearm; and
a deflector integrated into an accessory of the firearm, the deflector structured to alter a path of discharge gasses after the discharge gasses pass the LCI.

2. The firearm of claim 1, in which the integrated deflector is structured to block a gas path between the LCI and the accessory.

3. The firearm of claim 1, in which the accessory is a sight, and in which the integrated deflector is structured to block a gas path between the LCI and a lens of the sight.

4. The firearm of claim 1, in which the integrated deflector is a machined portion of the accessory.

5. The firearm of claim 1, in which the integrated deflector is a molded portion of the accessory.

6. The firearm of claim 1, in which the integrated deflector is made from a different type of material than a main body of the accessory, and in which the integrated deflector is permanently attached to the accessory.

7. The firearm of claim 1, in which the integrated deflector is further structured to block debris from striking the accessory.

8. The firearm of claim 1, in which the integrated deflector does not interfere with an operation of the LCI.

9. An accessory for a firearm including a transparent portion, comprising:
a deflector integrated with a body of the accessory and structured to divert a path of discharge gasses emitting from such firearm away from the transparent portion of the accessory.

10. The accessory for a firearm according to claim 9, in which the integrated deflector is structured to divert the path of discharge gasses emitting from a Loaded Chamber Indicator (LCI) of the firearm.

11. The accessory for a firearm according to claim 10, in which the accessory is a sight, and in which the integrated deflector is structured to block a gas path between the LCI and a lens of the sight.

12. An accessory for a firearm that includes a Loaded Chamber Indicator (LCI) for indicating a presence of a cartridge within a firing chamber of the firearm, the accessory comprising:
a deflector integrated into the accessory and structured to alter a path of discharge gasses away from a transparent portion of the accessory after the discharge gasses pass the LCI.

13. The accessory of claim 12, in which the accessory is a sight, and in which the integrated deflector is structured to block a gas path between the LCI and a lens of the sight.

14. A method of manufacturing an accessory for a firearm, comprising:
forming an integrated deflector into a body of the accessory, the integrated deflector structured to alter a path of discharge gasses between the firearm and the accessory when the firearm is discharged.

15. The method according to claim 14 in which forming an integrated deflector into a body of the accessory comprises machining the integrated deflector from a metal.

16. The method according to claim 14 in which forming an integrated deflector into a body of the accessory comprises injecting a material into a mold of the accessory.

17. The method according to claim 16 in which forming an integrated deflector into a body of the accessory comprises placing a formed deflector into the mold of the accessory prior to injecting the material into the mold of the accessory.

* * * * *